(12) United States Patent
Sisk et al.

(10) Patent No.: US 7,828,265 B2
(45) Date of Patent: *Nov. 9, 2010

(54) SOLENOID VALVE

(75) Inventors: Gregory E. Sisk, Farmington, MO (US); Tom Farace, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 638 days.

This patent is subject to a terminal disclaimer.

(21) Appl. No.: 11/933,247

(22) Filed: Oct. 31, 2007

(65) Prior Publication Data

US 2008/0042086 A1 Feb. 21, 2008

Related U.S. Application Data

(63) Continuation-in-part of application No. 11/653,777, filed on Jan. 16, 2007, now Pat. No. 7,367,543.

(51) Int. Cl.
*F16K 31/02* (2006.01)

(52) U.S. Cl. .................................. 251/129.19; 251/284

(58) Field of Classification Search ............ 251/129.19, 251/30.02, 30.03, 30.04, 284; 137/630.22
See application file for complete search history.

(56) References Cited

U.S. PATENT DOCUMENTS

| | | | |
|---|---|---|---|
| 3,100,103 A | 8/1963 | Bullard | |
| 3,107,893 A | 10/1963 | Bashe | |
| 3,114,532 A | 12/1963 | Gray et al. | |
| 3,484,076 A | 12/1969 | Naumann | 251/141 |
| 3,494,376 A | 2/1970 | Doeringsfeld et al. | |
| 3,578,284 A | 5/1971 | Martini | 251/88 |
| 3,630,482 A | 12/1971 | Beller | |
| 3,737,141 A * | 6/1973 | Zeuner | 251/129.07 |
| 4,624,282 A | 11/1986 | Fargo | |
| 5,232,196 A | 8/1993 | Hutchings et al. | |
| 5,294,089 A | 3/1994 | LaMarca | |
| 5,417,403 A | 5/1995 | Shurman et al. | 251/129 |
| 5,553,829 A | 9/1996 | Hemsen | 251/129 |
| 5,565,832 A | 10/1996 | Haller et al. | 335/249 |
| 5,603,482 A | 2/1997 | Mott et al. | 251/129 |

(Continued)

FOREIGN PATENT DOCUMENTS

CN 2607484 Y 3/2004

(Continued)

*Primary Examiner*—John Bastianelli
(74) *Attorney, Agent, or Firm*—Harness, Dickey & Pierce, P.L.C.

(57) ABSTRACT

A valve is provided that includes a housing having an inlet, an outlet, and a valve seat therebetween. The valve includes a valve member movable towards the valve seat towards engagement with a stop, and away from the valve seat when the solenoid is energized. The valve member has an opening in which a valve element is received. A spring urges the valve member and valve element towards the valve seat, and a solenoid moves the valve member away from the valve seat. The spring biases the valve member to a closed position, in which the valve element engages the valve seat, and the valve member engages a stop that prevents the valve member from impacting against the valve element that is seated against the valve seat. The solenoid when energized causes the valve member to move upward and pull the valve element away from the valve seat.

20 Claims, 5 Drawing Sheets

U.S. PATENT DOCUMENTS

| | | |
|---|---|---|
| 6,047,718 A | 4/2000 | Konsky et al. |
| 6,290,205 B1 | 9/2001 | Haga |
| 6,390,441 B2 | 5/2002 | Koyama et al. |
| 6,390,445 B2 | 5/2002 | Fukano ........................ 251/129 |
| 6,830,232 B2 | 12/2004 | Burrola ........................ 251/64 |
| 7,011,110 B1 | 3/2006 | Stark |

FOREIGN PATENT DOCUMENTS

JP      2002 213635      7/2002

* cited by examiner

SOLENOID VALVE

CROSS-REFERENCE TO RELATED APPLICATIONS

This application is a continuation-in-part of U.S. application Ser. No. 11/653,777, filed Jan. 16, 2007, which is a continuation of U.S. application Ser. No. 10/903,919, filed Jul. 30, 2004, now U.S. Pat. No. 7,163,188, which is incorporated herein by reference.

FIELD

The present disclosure relates to flow control valves, and more particularly to directional flow control valves.

BACKGROUND

The statements in this section merely provide background information related to the present disclosure and may not constitute prior art.

Solenoid actuators are commonly used to control the flow of fluids through a valve, and may be electrically actuated. Various references have disclosed solenoid valve designs in which a moveable member is in engagement with a valve, and operates the valve between an open and a closed position. However, such valve designs are not capable of withstanding numerous cycles of the valve opening and closing due to the impact force imparted by the moveable member on the valve and valve seat. Also, the typical valve design is such that a connection of both the inlet and outlet are required, which adds to the cost and assembly time of the valve.

SUMMARY

The present disclosure relates to a flow control valve having a valve member that resiliently engages a valve seat to seal or close off flow through the valve seat. In the various embodiments, the flow control valve comprises a housing having an inlet and an outlet. The various valve embodiments also include a valve seat in a flow path between the inlet and the outlet, and a valve member movable in a direction towards the valve seat to a position of engagement with a stop, and in a direction away from the valve seat when the solenoid is energized. The valve member has an opening in an end of the valve member, and a valve element is slidably received within the opening in the valve member. The valve element is configured to sealingly engage or seat against the valve seat. The various embodiments of a flow control valve further include a spring for urging the valve member towards the valve seat, and a solenoid for causing the valve member to move away from the valve seat. The spring biases the valve member towards a first position where fluid flow is prohibited through the outlet, in which position the valve element is in engagement with the valve seat and the valve member is in engagement with a stop preventing the valve member from impacting against the valve element seated against the valve seat. The solenoid, when energized, causes the valve member to move towards a second position where fluid flows through the outlet, in which position the valve element is pulled by the valve member away from the valve seat.

In another aspect of the present invention, the retaining member of the valve member is configured to engage a shoulder of the seated valve element, to help unseat and pull the valve element away from the valve seat in situations where the fluid being controlled may cause the valve element to stick to the valve seat. In the various embodiments, activating the solenoid causes the valve member to begin moving and establish momentum before a retaining member of the valve member engages the shoulder of the valve element that is seated against the valve seat, which momentum imparts a force against the valve element's shoulder for moving the valve element away from the valve seat to an open position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
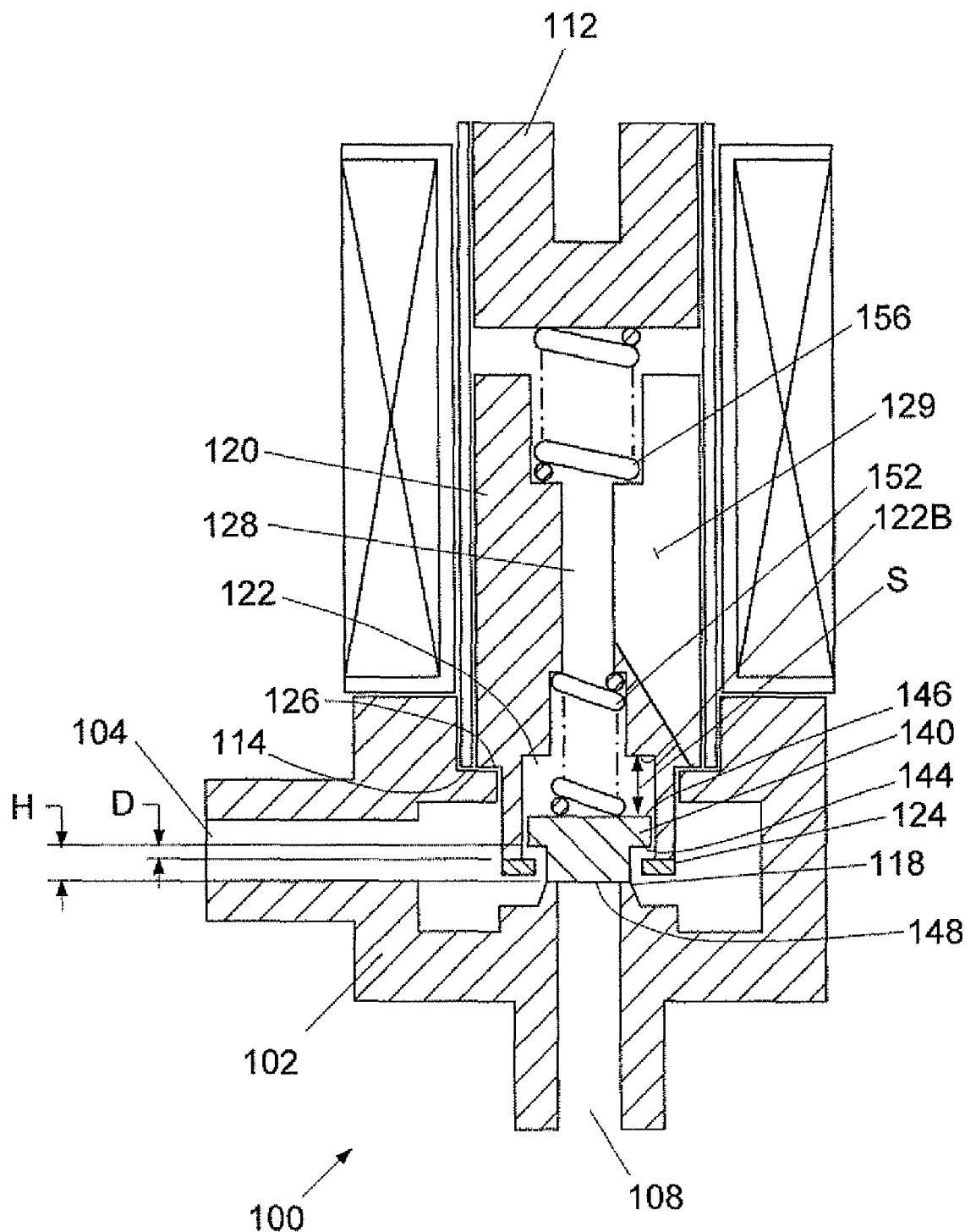
FIG. 1 is a longitudinal cross-sectional view of one embodiment of a solenoid valve in a first position, in accordance with the principles of the present disclosure.

The following description is merely exemplary in nature and is not intended to limit the present disclosure, application, or uses. It should be understood that throughout the drawings, corresponding reference numerals indicate like or corresponding parts and features.

According to various aspects of the present disclosure, there are provided various exemplary embodiments of a flow control valve. In the various embodiments, a flow control valve is provided that comprises a housing having an inlet and an outlet. The various valve embodiments also include a valve seat in a flow path between the inlet and the outlet, and a valve member movable in a first direction towards the valve seat to a position of engagement with a stop, and in a direction away from the valve seat when the solenoid is energized. The valve member has an opening in an end of the valve member, and a valve element is slidably received within the opening in the valve member. The valve element is configured to sealingly engage or seat against the valve seat. The various embodiments of a flow control valve further include a spring for urging the valve member towards the valve seat, and a solenoid for causing the valve member to move away from the valve seat to an open position in which fluid flow is permitted. The spring biases the valve member towards a first position where fluid flow is prohibited through the outlet, in which position the valve element is moved into engagement with the valve seat and the valve member is in engagement with a stop. The stop prevents the valve member from impacting against the valve element that is seated against the valve seat. Accordingly, the stop prevents the impact of the valve member against the valve element that is seated against the valve seat, to reduce damage to the valve element and extending the useful life of the valve.

Referring to FIG. 1, one embodiment of a flow control valve 100 according to the principles of the present application is shown in FIG. 1. The valve 100 includes a housing 102 having an inlet 104 and an outlet 108. The housing 102 further comprises a valve seat 118 in the flow path between the inlet 104 and the outlet 108. The valve 100 preferably includes a stop 114 and a second stop or core 112 disposed within the valve 100, which are configured to limit the travel of a movable valve member disposed within the valve 100.

The valve 100 further includes a valve member 120 that is slidably disposed within an enclosure of the valve 100, between the valve seat 118 and the core 112. The valve member 120 includes a slidable valve element 140 at one end 122 of the valve member 120, which is retained by retaining member 124. The valve member 120 further includes a passage 128 extending axially through the valve member 120, through which fluid may flow. The valve member 120 further includes a shoulder portion 126 configured to engage the stop 114. The valve member 120 is movable in one direction towards a core 112, and is movable in an opposite direction towards the valve seat 118 to a position of engagement with the stop 114. The valve member 120 is preferably slidable within the valve 100 for moving between a first position in which the valve element 140 sealingly engages the valve seat 118 to prohibit fluid flow through the valve seat 118 to the outlet 108, and a second position shown in FIG. 2, in which the valve element 140 is spaced apart from the valve seat 118 to permit fluid flow from the inlet 104 to the outlet 108.

In the first embodiment, the valve member 120 preferably has an opening 122 in the end of the valve member 120 facing the valve seat 118, in which the valve element 140 is slidably disposed. The valve element 140 has a portion thereon that is configured to be engaged by another component, and is preferably a shoulder portion 144. Adjacent the opening 122 of the valve member 120 is a retaining member 124, which is configured to engage the valve element's shoulder portion 144, to captively retain the valve element 140 within opening 122. The valve element 140 is preferably biased by a spring 152, which spring maintains the valve element 140 in a spaced apart manner relative to the bottom surface 122B in the valve member's opening 122. The spring 152 is preferably received within a recess that extends inwardly from the opening 122, where one end of the spring engages the valve member 120 and the other end engages the valve element 140 to bias the valve element towards the valve seat 118. This spaced apart arrangement permits movement of the valve element 140 relative to the valve member 120 against the bias of the spring. The opening 122 is of a depth that is sufficient to maintain a minimum spacing between the bottom surface 122B of the opening 122 and the valve element 140, as further described below.

In the first embodiment, the valve 100 further includes a return spring 156 that provides a force for urging the valve member 120 towards a closed position. When the solenoid is de-energized, the force of the return spring 156 causes the valve member 120 to move towards the valve seat 118, which results in the sealing surface 148 of the valve element 140 engaging and closing off the valve seat 118. The return spring 156 further causes the valve member 120 to move or travel over and beyond this point of closure of the valve seat 118, to a position where the valve member's shoulder 126 engages stop 114. While the return spring 156 continues to move the valve member 120 beyond the closure of the valve seat, the valve element 140 remains stationary in its seated or closed position. This continued movement or "over-travel" of the valve member 120 after the valve element 140 reaches a stationary position against the seat 118 causes relative movement between the valve member 120 and valve element 140. Such relative movement reduces the spacing or distance between the valve member 120 (122B) and the valve element 140, which results in the compression of biasing spring 152.

This compression of biasing spring 152 provides a force for holding the valve element 140 against the valve seat 118. In this exemplary embodiment, this force is preferably in the range of 0.01 to 0.03 pounds. The above "over-travel" distance is the distance that the valve member 120 travels beyond the point the valve element 140 engages and becomes stationary against the valve seat 118, to reach the stop 114. This "over-travel" distance is reflected by the separation or distance D between the valve element's shoulder 144 and the retaining member 124, as shown in FIG. 1. In this exemplary embodiment, this "over-travel" distance is preferably in the range of 0.005 inches to 0.020 inches. The valve members opening 122 preferably has a depth that is sufficient to provide a minimum spacing between the back side 146 of the valve element 140 and the bottom surface 122B within the valve member's opening 122, which minimum spacing S is at least greater than the "over-travel" distance D. The minimum spacing S is preferably greater than the over-travel distance to ensure that the continued movement of the valve member 120 after closure against the valve seat 118 does not cause the bottom surface 122B within the opening 122 to engage or impact against the back side 146 of the then stationary valve element 140. The minimum spacing S is also preferably not more than the height H of a portion of the valve element 140, as shown in FIG. 1. With spacing S less than the height H, the valve element 140 cannot retract fully within opening 122 and become lodged behind the retaining member 124. This prevents the valve element 140 from becoming dislodged.

Figure 2:
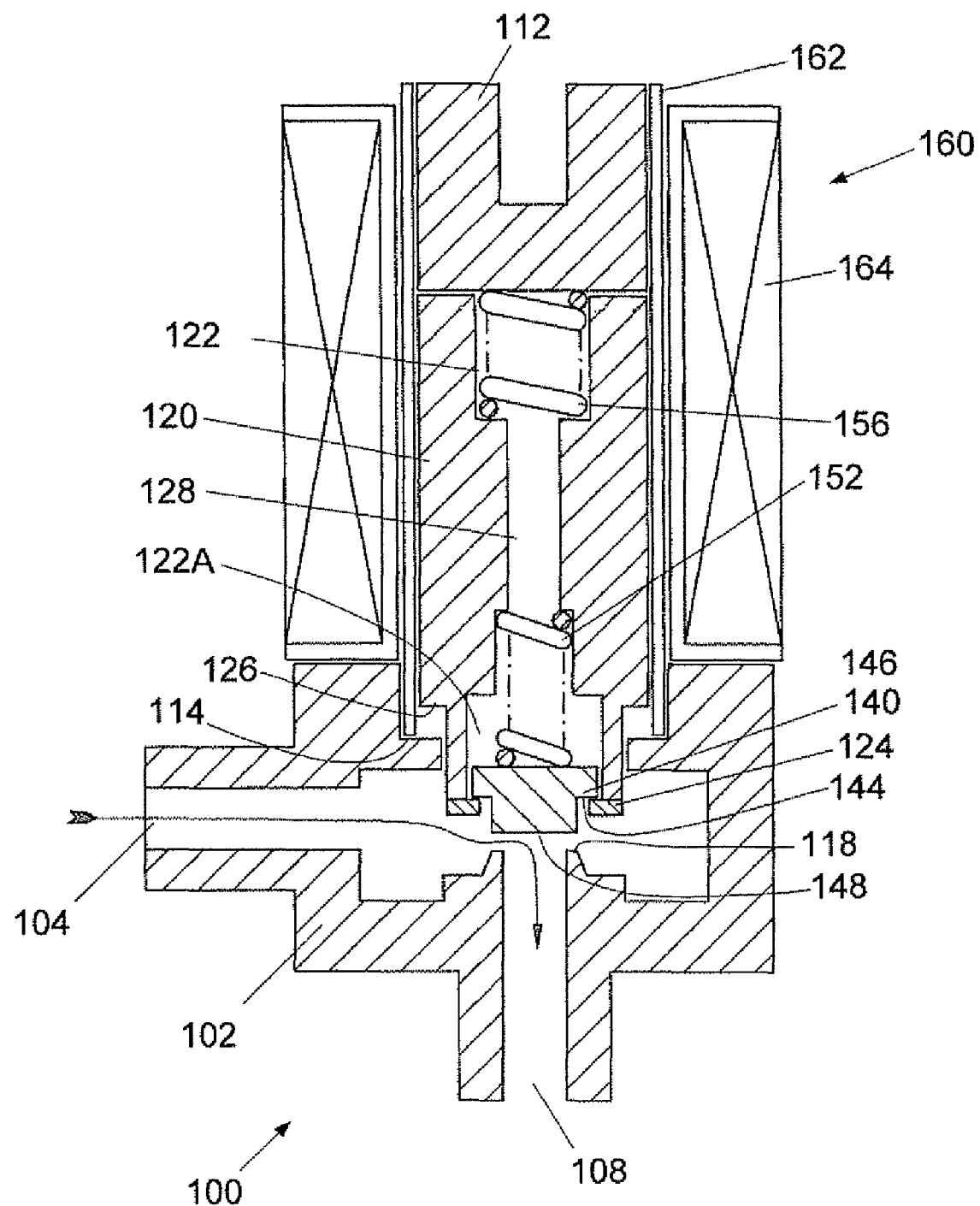
FIG. 2 is a longitudinal cross-sectional view the solenoid valve of FIG. 1, shown in a second position.

When the valve element 140 is spaced apart from the valve seat 118 as in FIG. 2, the arrangement of the stop 114 relative to the valve member's shoulder 126 provides a separation that is greater than that of the arrangement of the valve element's sealing surface 148 relative to the valve seat 118, to provide for at least a predetermined overtravel distance D. Since the predetermined spacing S (between the valve element's back side 146 and the valve member's bottom surface 122B within opening 122) is greater than the over-travel distance D, the stop 114 prevents the valve member's bottom surface 122B from reaching or engaging the valve element 140 as shown in FIG. 1. The shoulder 126 of the valve member 120 engages the stop 114, which arrests further movement of the valve member 120 and absorbs the impact of its movement, preventing it from being transferred to valve element 140 seated against the valve seat 118. Thus, the impact force of the valve member 120 against the valve element 140 is avoided, reducing damage to the valve element 140 and extending the useful life of the valve 100. Designs in which the valve element is impacted against the valve seat typically result in deformation of the sealing surface and lead to valve failure. Testing of one embodiment of a valve incorporating such an arrangement of a travel-limiting stop that prevents impact by a sliding valve member against a movable valve element has yielded 32 million cycles of flow control operation at 140 psig without failure.

In the first embodiment, the valve member further includes a solenoid coil 160 that when energized provides a force for urging the valve member 120 towards an open position as shown in FIG. 2. When the solenoid is energized, it generates a force that causes the valve member 120 to move towards the core 112, to a position where the end of the valve member 120 engages the core 112.

In the first embodiment, the solenoid 160 generally surrounds the valve member 120, and preferably includes an enclosure or tube 162 having one end approximate the valve housing 102 with the stationary core 112 secured within the opposite end. The valve member 120 is slideably disposed within the enclosure or tube 162. The ends of the tube 162 may be secured to the valve by an adhesive, welding, or other suitable joining means. The tube 162 is preferably made of a 304L stainless steel that reduces the risk of carborization in the tube 162 from welding, which can lead to cracking or stress fracture. The solenoid further comprises a coil 164 that generally surrounds the tube 162, and is configured to be energized by a voltage or current source. When energized, the solenoid 160 causes the valve member 120 to move against the bias of the spring 156 towards core 112 and away from the stop 114.

When the solenoid 160 is not energized, the valve element 140 sealingly engages the valve seat 118 to close off flow through the valve seat 118. In the first embodiment, the valve element 140 may be made of a lightweight fluorinated hydrocarbon polymer such as Teflon, or other polymeric or resilient sealing material, or PTFE, or a combination of different materials bonded together. Depending on the type of fluid that the valve is used to control, the fluid itself may cause an adherence between the valve element and the valve seat when the valve element is seated against the valve seat. Such a situation can cause a sticking condition that can increase the difficulty of pulling the valve element away from the valve seat, which situation is addressed as discussed below.

When the solenoid 160 is actuated, the valve member 120 initially begins moving away from the stop 114, while the valve element 140 remains stationary against the valve seat 118. Thus, the valve member 120 moves relative to the stationary valve element 140, until it travels the "over-travel" distance D described above, after which the valve member's retaining member 124 engages the shoulder 144 on the stationary valve element 140. The initial movement of the valve member 120 establishes momentum before a retaining member 124 of the valve member 120 engages the shoulder 144 of the valve element 140 (which is in sealing engagement against the valve seat 118). This momentum imparts a force against the valve element's shoulder 144 for moving the valve element 140 away from the valve seat 118 towards an open position. The retaining member 124 engages the shoulder 144 of the valve element 140, to help unseat and pull the second valve element 140 away from the valve seat 118 in situations where the fluid being controlled may cause the valve element to stick to the valve seat. Thus the over-travel also enables the valve member 120 to help unseat and pull the valve element 140 away from the valve seat 118. Upon impacting the valve element's shoulder 144, the valve element 140 initially moves away from the seat 118, and allows the inlet pressure pushing the valve element 140 towards a closed position to bleed off through the valve seat 118. Accordingly, this impact against the shoulder 144 also helps the solenoid to open the valve element 140 against high inlet pressure.

Referring to FIG. 1, the valve member 120 may further include a slot 129 extending longitudinally also the valve member 120, and into the passage 128. This slot 129 increases the cross-sectional area through which fluid may flow through the valve member 120. This design feature allows fluid trapped above the valve member 120 to flow through the slot 129 when the valve member 120 is moved upward by the solenoid. The slot accordingly reduces the hydraulic effect that acts against or resists the movement of the valve member 120 upward by the solenoid, to thereby reduce the required force that the solenoid must generate to move the valve member 120.

It should be noted that the biasing spring 152 is sized such that when the valve element 140 seats against the valve seat 118 and the valve member 120 engages the stop 114, the spring 152 is not fully compressed to a solid height. This ensures that the momentum of the valve member 120 is not transferred though the compressed spring 152 to the valve element 140, which would impact the valve element 140 against the valve seat 118.

It should be noted that the stop 114 in the above embodiments may be formed in the valve housing at the junction between the end of the tube and the valve housing. Alternatively, the stop may be formed within the tube, or may comprise a separate part altogether. Thus, the stop component is not limited to the design in the above exemplary embodiments, and should be understood to include any design suitable for limiting the travel of the valve member.

It is also noted that in the above exemplary embodiment, the opening 122 in the valve member and the retaining member 124 adjacent the opening may also comprise other alternative designs. The opening may comprise a cylindrical chamber, or side wall portions, or other structure that may extend from the valve member. Likewise, the retaining member may comprise an annular ring that engages a leg or shoulder formed on a portion of the valve member 120, or alternatively may comprise a tab projecting from a side wall extending from the valve member. Accordingly, the opening and retaining member are not limited to the design in the above exemplary embodiment, and should be understood to include any design suitable for receiving and limiting the travel of the valve elements slidably disposed on the ends of the valve member.

Figure 3:
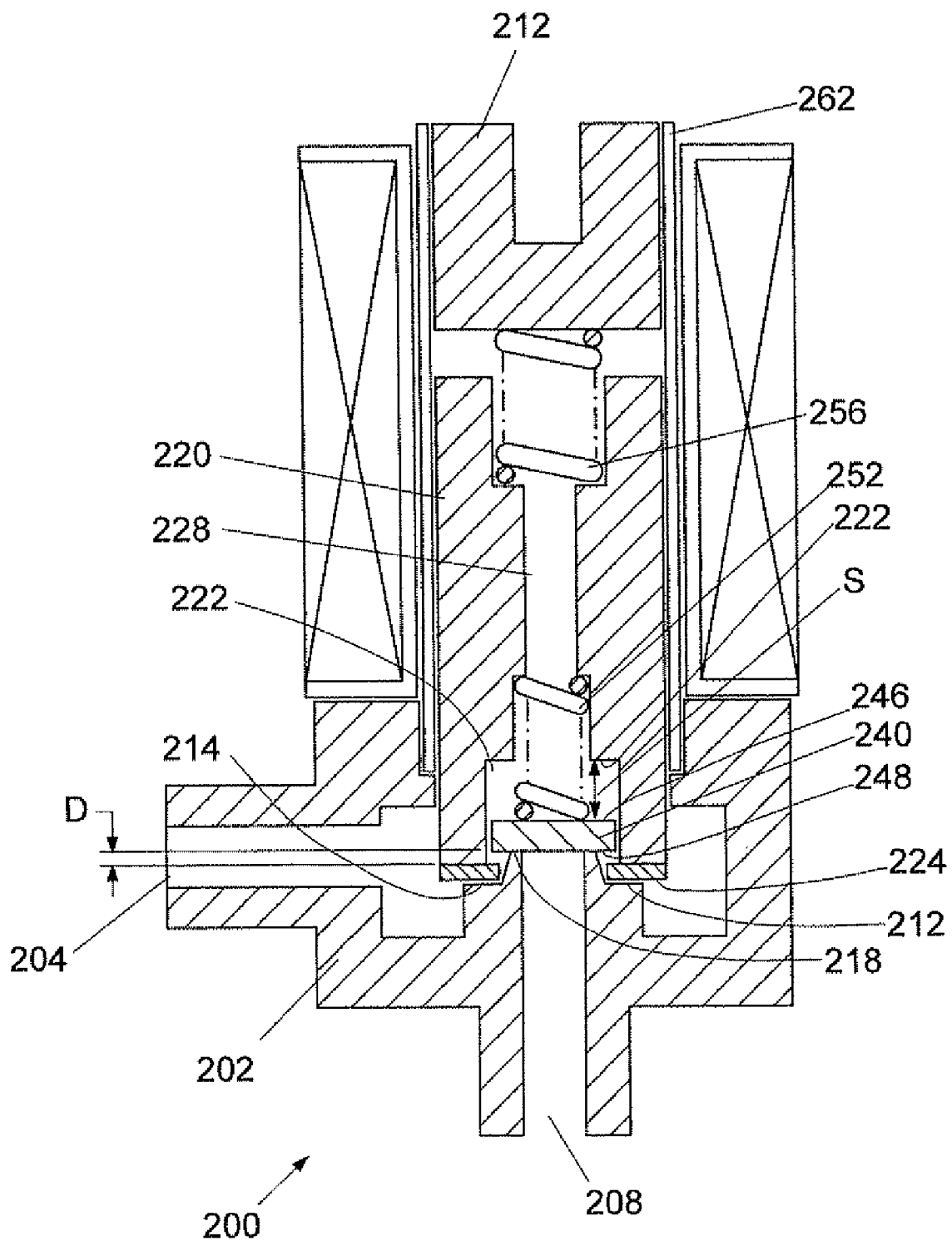
FIG. 3 is a longitudinal cross-sectional view of a second embodiment of a solenoid valve in a first position.

In a second embodiment shown in FIG. 3, a valve is provided that is similar in function to the first embodiment. The valve 200 includes a housing 202 having an inlet 204 and an outlet 208. The housing 202 further comprises a valve seat 218 in the flow path between the inlet 204 and the outlet 208. The valve 200 preferably includes a stop 214 and a second stop or core 212 disposed within the valve 200, which are configured to limit the travel of a movable valve member disposed within the valve 200.

The valve 200 further includes a valve member 220 that is slidably disposed within an enclosure of the valve 200, between the valve seat 218 and the core 212. The valve member 220 includes a slidable valve element 240 at one end 222 of the valve member 220, which is retained by retaining member 224. The valve member 220 further includes a passage 228 extending axially through the valve member 220, through which fluid may flow. The end of the valve member 220, or the retaining member 224 on its end, are configured to engage the stop 214. The valve member 220 is movable by a solenoid in one direction towards a core 212, and is movable in an opposite direction towards the valve seat 218 to a position of engagement with the stop 214. The valve member 120 is preferably slidable within the valve 200 for moving between a first position in which the valve element 240 sealingly engages the valve seat 218 to prohibit fluid flow through the valve seat 218 to the outlet 208, and a second position shown in FIG. 4, in which the valve element 240 is spaced apart from the valve seat 218 to permit fluid flow from the inlet 204 to the outlet 208.

In the second embodiment, the valve member 220 preferably has an opening 222 in the end of the valve member 220 facing the valve seat 218, in which the valve element 240 is slidably disposed. Adjacent the opening 222 of the valve member 220 is a retaining member 224, which is configured to engage a portion of the valve element's surface 248 to captively retain the valve element 240 within opening 222. The valve element 240 is preferably biased by a spring 252, which spring maintains the valve element 240 in a spaced apart manner relative to the bottom surface 222B in the valve member's opening 222. The spring 252 is preferably received within a recess that extends inwardly from the opening 222, where one end of the spring engages the valve member 220 and the other end engages the valve element 240 to bias the valve element towards the valve seat 218. This spaced apart arrangement permits movement of the valve element 240 relative to the valve member 220, against the bias of the spring 252. The opening 222 is of a depth that is sufficient to maintain a minimum spacing between the bottom surface 222B of the opening 222 and the valve element 240, as further described below.

In the second embodiment, the valve 200 further includes a return spring 256 that provides a force for urging the valve member 220 towards a closed position. When the solenoid is de-energized, the force of the return spring 256 causes the valve member 220 to move towards the valve seat 218, which results in the sealing surface 248 of the valve element 240 engaging and closing off the valve seat 218. The return spring 256 further causes the valve member 220 to move or travel over and beyond this point of closure of the valve seat 218, to a position where the valve member's end engages stop 214. While the return spring 256 continues to move the valve member 220 beyond the closure of the valve seat, the valve element 240 remains stationary in its seated or closed position. This continued movement or "over-travel" of the valve member 220 after the valve element 240 reaches a stationary position against the seat causes relative movement between the valve member 220 and valve element 240. Such relative movement reduces the spacing or distance between the valve member 220 and valve element 240, which results in the compression of biasing spring 252. This compression of biasing spring 252 provides a force for holding the valve element 240 against the valve seat 218. The spring force may be that which is effective to enable the valve element 240 to sufficiently restrict flow through the valve seat 218. The "over-travel" distance is the distance that the valve member 220 travels, after the point the valve element 240 engages and becomes stationary against the valve seat 218, to reach the stop 214. This "over-travel" distance is reflected by the separation or distance D between the valve element's surface 248 and the retaining member 224, as shown in FIG. 3. The "over-travel" distance is preferably that which will ensure sufficient compression of the biasing spring 152 to provide a force effective to enable the valve element 240 to sufficiently restrict flow through the valve seat 218. The valve member's opening 222 preferably has a depth that is sufficient to provide a minimum spacing between the back side 246 of the valve element 240 and the bottom surface 222B within the valve member's opening 222, which minimum spacing S is at least greater than the "over-travel" distance D. The minimum spacing S is preferably greater than the over-travel distance to ensure that the continued movement of the valve member 220 after closure against the valve seat 218 does not cause the bottom surface 222B within the opening 222 to engage or impact against the back side 246 of the then stationary valve element 240.

Figure 4:
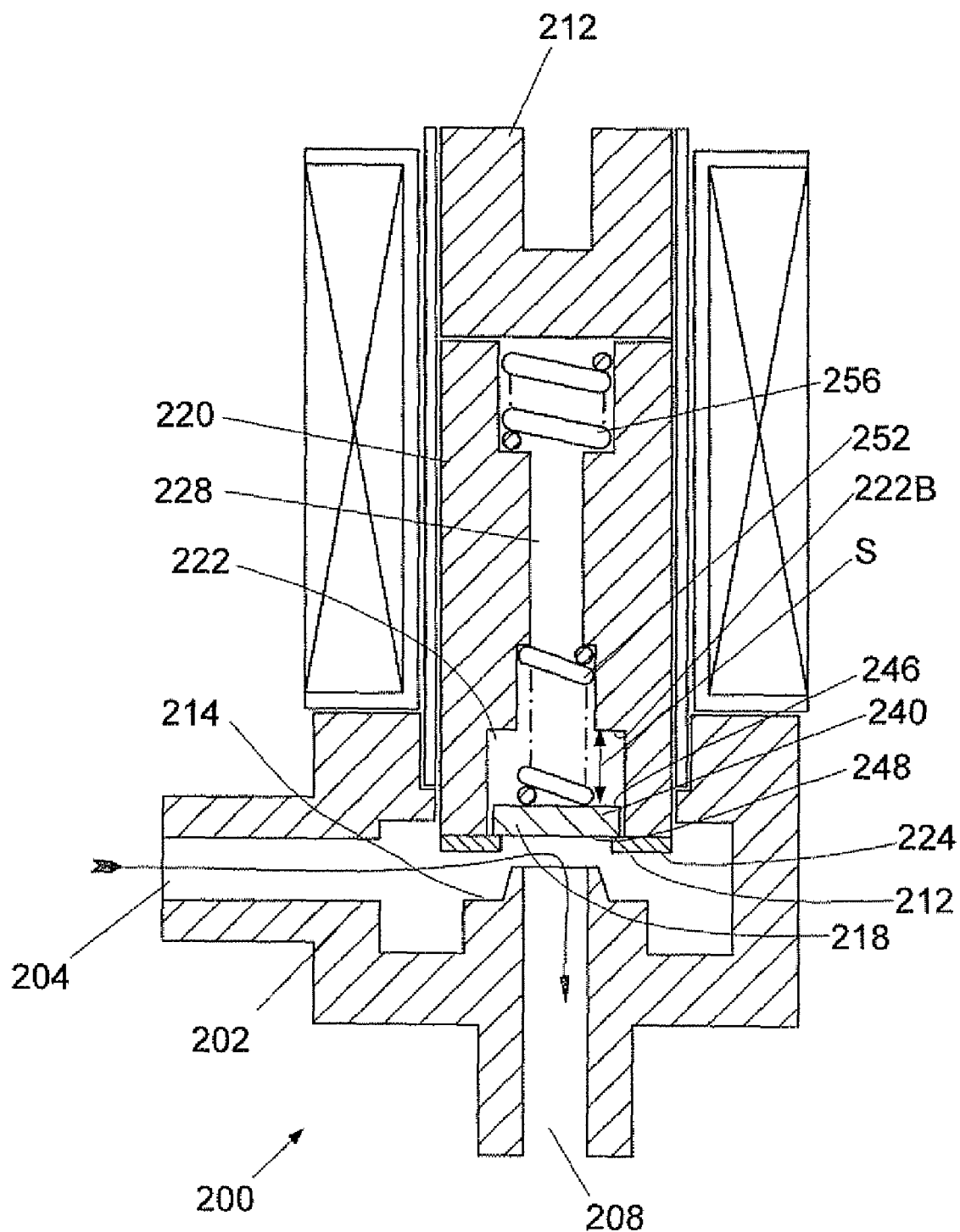
FIG. 4 is a longitudinal cross-sectional view the solenoid valve of FIG. 3, shown in a second position.

When the valve element 240 is spaced apart from the valve seat 218 as in FIG. 4, the arrangement of the stop 214 relative to the valve member's end 224 provides a separation that is greater than that of the arrangement of the valve element's sealing surface 248 relative to the valve seat 218, to provide for at least a predetermined over-travel distance D. Since the predetermined spacing S (between the valve element's back side 246 and the valve member's bottom surface 222B within opening 222) is greater than the over-travel distance D, the stop 214 prevents the valve member's bottom surface 222B from reaching or engaging the valve element 240 as shown in FIG. 1. The end or retaining member 224 of the valve member 220 engages the stop 214, which arrests further movement of the valve member 220 and absorbs the impact of its movement, preventing the momentum from being transferred to valve element 240 seated against the valve seat 218. Thus, the impact force of the valve member 220 against the valve element 240 is avoided, reducing damage to the valve element 240 and extending the useful life of the valve 200.

In the second embodiment, the valve member further includes a solenoid coil 260 that when energized provides a force for urging the valve member 220 towards an open position as shown in FIG. 4. When the solenoid is energized, it generates a force that causes the valve member 220 to move towards the core 212, to a position where the end of the valve member 220 engages the core 212.

In the second embodiment, the solenoid 260 generally surrounds the valve member 220, and preferably includes an enclosure or tube 262 having one end approximate the valve housing 202 with the stationary core 212 secured within the opposite end. The valve member 220 is slideably disposed within the enclosure or tube 262. The ends of the tube 262 may be secured to the valve by an adhesive, welding, or other suitable joining means. The tube 262 may be made of a 304L stainless steel, so as to reduce the risk of carborization that can lead to cracking or stress fracture. The solenoid further comprises a coil 264 that generally surrounds the tube 262, and is configured to be energized by a voltage or current source. When energized, the solenoid 260 causes the valve member 220 to move against the bias of the spring 256 towards core 212 and away from the stop 214.

When the solenoid 260 is not energized, the valve element 240 sealingly engages the valve seat 218 to close off flow through the valve seat 218. In the second embodiment, the valve element 240 may be made of a lightweight fluorinated hydrocarbon polymer such as Teflon, or other polymeric or resilient sealing material, or PTFE, or a combination of different materials bonded together. Depending on the type of fluid that the valve is used to control, the fluid itself may cause an adherence between the valve element and the valve seat when the valve element is seated against the valve seat. Such a situation can cause a sticking condition that can increase the difficulty of pulling the valve element away from the valve seat, which situation is addressed as discussed below.

When the solenoid 260 is actuated, the valve member 220 initially begins moving away from the stop 214, while the valve element 240 remains stationary against the valve seat 218. Thus, the valve member 220 moves relative to the stationary valve element 140, until it travels the "over-travel" distance D described above, after which the valve member's retaining member 224 engages the surface 248 on the stationary valve element 240. The initial movement of the valve member 220 establishes momentum before the retaining member 224 of the valve member 220 engages the valve element 240 (which is in sealing engagement against the valve seat 218). This momentum imparts a force against the valve element's surface 248 for moving the valve element 240 away from the valve seat 218 towards an open position. The retaining member 224 engages the surface 248 of the valve element 240, to help unseat and pull the second valve element 240 away from the valve seat 218 in situations where the fluid being controlled may cause the valve element to stick to the valve seat. Thus the over-travel also enables the valve member 220 to help unseat and pull the valve element 240 away from the valve seat 218. Upon impacting the valve element 240, the valve element 240 initially moves away from the seat 218, and allows the inlet pressure pushing the valve element 240 towards a closed position to bleed off through the valve seat 218. Accordingly, this impact against the edge of the valve element 240 also helps the solenoid to open the valve element 240 against high inlet pressure.

As in the first embodiment, the valve member 220 of the second embodiment may also include a slot extending longitudinally through the valve member 220 and into passage 228. This type of slot increases the cross-sectional area through which fluid may flow through, to allow fluid trapped above the valve member 220 to flow through the slot when the valve member is moved upward by the solenoid. Such a slot accordingly reduces the hydraulic effect that acts against or resists the movement of the valve member 220 upward by the solenoid, to thereby reduce the required force that the solenoid must generate to move the valve member 220.

It should be noted that the biasing spring 252 is sized such that when the valve element 240 seats against the valve seat 218 and the valve member 220 engages the stop 214, the spring 252 is not fully compressed to a solid height. This ensures that the momentum of the valve member 220 is not transferred though the compressed spring 252 to the valve element 240, which would impact the valve element 240 against the valve seat 218.

In the second embodiment disclosed above, a coil 260 is provided that produces a magnetic field when energized by a power source. The magnetic field generates a force that acts to move the moveable valve member 220 towards the stationary core or stop 212. The various embodiments of a valve may have a stationary core 212 that further comprises a conductive shading ring 250, which serves to establish a secondary magnetic field where the particular embodiment may be used in an AC voltage application. Alternatively, the various embodiments may comprise a solenoid coil 212 that is at least adapted to be energized by a direct current (DC) voltage or a rectified alternating current source. Energizing the solenoid coil with a DC voltage source or a rectified alternating current source provides for solenoid operation at a much lower noise level than with an AC voltage source, because the non-cyclic nature of the power source provides a more consistent electromagnetic field that that produced by an alternating current solenoid.

Figure 5:
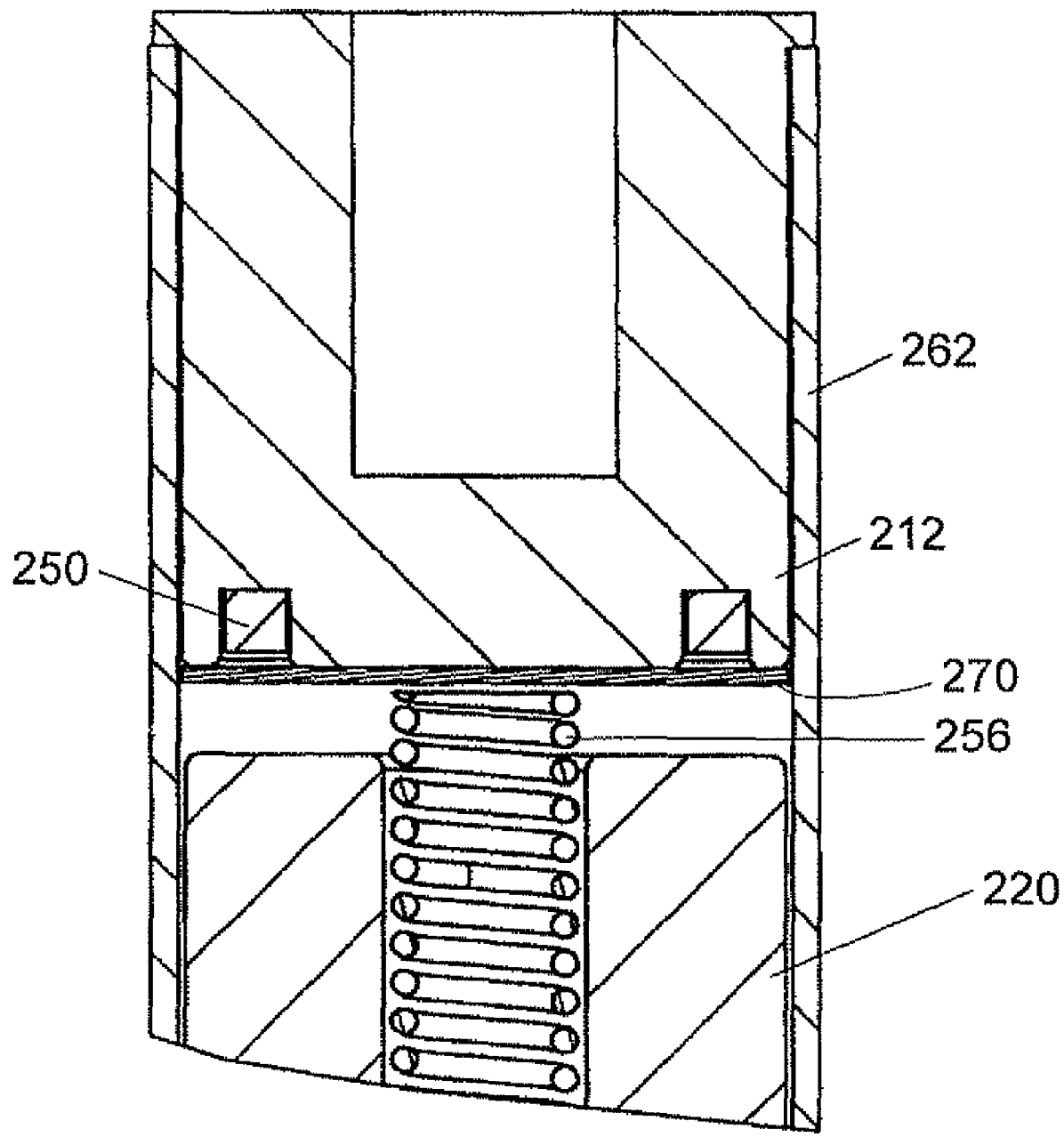
FIG. 5 is an alternate construction of the above valve embodiments.

Referring to FIG. 5, the second embodiment (and other embodiments) may further comprise a resilient dampening member 270 associated with the stationary core or stop 212, for preventing direct contact between the moving valve member 220 and the stationary core 212. The resilient dampening member 270 preferably has an outer diameter close to that of the stationary core 212. One end of spring 256 is in contact with the resilient dampening member 270, and the other end of spring 256 biases the movable valve member 220 away from the resilient dampening member 270 and the stationary core 212. When the solenoid is energized to move the movable valve member 220 towards the stationary stop 212, the resilient dampening member dampens the impact between the moveable valve member 220 and the stationary stop 212. The resilient dampening member accordingly provides for reducing the noise associated with energizing the solenoid to less than a predetermined decibel value.

In some embodiments, the stationary stop 212 is preferably welded or braised to the tube 262 to provide a hermetic seal. The resilient dampening member 270 is independent from the stationary stop 212, and is not pre-assembled, insert molded, glued or adhered to, or swaged on to the stationary stop 212. This allows the stationary stop 212 to be welded to the tube without possibly damaging the resilient dampening member 270. Likewise, the resilient dampening member 270 is independent from the moveable valve member 220, and is not pre-assembled, insert molded, adhered to, or swaged onto the movable valve member 220. The resilient dampening member 270 accordingly is not insert molded within or over either the stationary stop 212 or movable valve member 220. Rather, the resilient dampening member 270 may be easily placed within the tube 262 so as to be disposed between the stationary stop 212 and the movable valve member 220, and is biased by the spring 256 against the stationary stop 212. By virtue of the spring 256 biasing the resilient dampening member 70 in position against the stationary stop 212, a simple resilient dampening member 270 is provided in the various embodiments that may be easily assembled without requiring any gluing, application of adhesive, or affixing to the stationary stop 212 or moveable valve member 220.

In the normally closed valve position shown in FIG. 5, the moveable valve member 220 is separated from the resilient damping member 270 by a gap of a predetermined size depending on the desired stroke of the solenoid design. When the solenoid is energized, the moveable valve member 220 moves towards the stationary stop 212. The resilient damping member 270 provides a cushion for absorbing the shock or impact between the moveable valve member 220 and the stationary stop 212 when the moveable valve member 220 moves to the fully open position. The resilient dampening member is compressed by the movable valve member 220 to dampen the impact, and to absorb the shock. The resilient dampening member 270 is preferably made of rubber or a flouroelastomer, but may alternatively be made of any material capable of being compressed to suitably dampen or absorb the impact as in the present solenoid embodiments. The quiet operation and extended service life this valve is particularly well suited for use in a compressor, which because of the long service life of the valve can be operated continuously to reduce start-up wear on the compressor and motor.

The above disclosed embodiments of a flow control valve including an impact avoiding feature provide an economical robust valve design that can operate for a significant number of cycles without failure by significantly reducing the impact force exerted on the sealing valve element when seated against the valve seat in a closed position. Because of the extended service life this valve is particularly well suited for use in a compressor, which because of the long service life of the valve can be operated continuously, reducing start-up wear on the compressor and motor.

The advantages of the above described embodiment and improvements should be readily apparent to one skilled in the art, as to enabling a resilient, high cycling solenoid valve for fluid control. Additional design considerations, such as limiting the stroke of travel of the valve member to reduce impact against the core, or control of the application of voltage to the solenoid coil, may be incorporated without departing from the spirit and scope of the invention. Accordingly, it is not intended that the invention be limited by the particular embodiment or form described above, but by the appended claims.

What is claimed is:

1. A flow control valve comprising:
   a housing having an inlet, an outlet and a valve seat in a flow path between the inlet and the outlet;
   a valve member movable in a first direction towards the valve seat to a position of engagement with a stop, and in a second direction away from the valve seat towards a stationary core, the valve member having an opening in an end of the valve member;
   a valve element slidably received within the opening in the valve member, the valve element being configured to sealingly engage the valve seat;

a spring for biasing the valve member towards a first position where fluid flows through the valve seat to the outlet, in which position the valve element is in engagement with the valve seat, and the valve member is in a position of engagement with the stop that prevents the valve member from impacting against the valve element in engagement with the valve seat; and a solenoid that, when energized, causes the valve member to move towards a second position where fluid flows through the valve seat to the outlet, in which position the valve element is spaced apart from the valve seat.

2. The flow control valve of claim 1 wherein the valve member is slidably disposed within the housing between a first stop and a second stop, and is configured to reciprocally move towards either the valve seat or the second stop.

3. The flow control valve of claim 1 wherein the valve element is biased by a spring that maintains a spacing between the valve element and the valve member, which spacing permits movement of the valve element relative to the valve member.

4. The flow control valve of claim 3 wherein the valve element is sufficiently spaced apart from the moveable valve member such that when the sealing surface of the valve element engages the valve seat, the valve member engages the stop before the valve member engages the valve element, such that the valve member does not impact against the valve element seated against the valve seat to thereby preserve the valve element's sealing surface.

5. The flow control valve of claim 4 wherein the valve element has a shoulder thereon, and the valve member has a retaining member adjacent the opening in the valve member that is configured to engage the valve element's shoulder, such that the retaining member captively retains the valve element within the opening in a spaced apart manner relative to the valve member.

6. The flow control valve of claim 5 wherein activation of the solenoid causes the valve member to move away from the stop and establish momentum before a retaining member of the valve member engages the valve element that is in sealing engagement against the valve seat, which momentum provides an impact against the valve element for moving the valve element away from the valve seat to an open position.

7. The flow control valve of claim 4 wherein the valve member further comprises a passage extending longitudinally through a portion of the valve member, which passage permits fluid flow through the valve member to reduce the hydraulic effect acting against the movement of the valve member.

8. A flow control device comprising:

a housing having an inlet, an outlet and a valve seat in a flow path between the inlet and the outlet;

a valve member slidably disposed within the housing approximate the valve seat, having an opening in a first end facing the valve seat, and a passage extending through a portion of the valve member through which fluid may flow, the valve member being configured to move towards the valve seat to a position of engagement with a first stop, and away from the valve seat to a position of engagement with a second stop;

a valve element having an end portion slidably received within the opening in the valve member, the valve element being biased to establish a spacing between the valve element and the valve member;

a spring that provides a biasing force for biasing the valve member towards a first position, in which position the valve element is in sealing engagement with the valve seat, and the valve member is in a position of engagement with the first stop, which first stop prevents the valve member from impacting against the valve element in engagement with the valve seat; and a solenoid that, when energized, provides a force for overcoming the spring's biasing force and urging the valve member towards the second position, in which position the valve element is spaced apart from the valve seat and the valve member is moved into a position of engagement with the second stop, wherein fluid flow is permitted from the inlet through the valve seat to the outlet when the valve member is in the first position, and fluid flow through the valve is not permitted from the inlet through the valve seat to the outlet when the valve member is in the second position.

9. The flow control device of claim 8 wherein the valve member is slidably disposed within the housing between the first stop and the second stop, and is configured to reciprocally move between the first stop and the second stop.

10. The flow control device of claim 8 each of the valve element is sufficiently spaced apart from the moveable valve member such that when the valve element engages the valve seat, the valve member engages the stop before the valve member engages the valve element, so that any impact of the valve member against the valve element is prevented.

11. The flow control device of claim 8 wherein the valve element has a shoulder thereon, and the valve member has a retaining member adjacent the opening in the valve member that is configured to engage the valve element's shoulder, such that the retaining member captively retains the valve element within the opening in a spaced apart manner relative to the valve member.

12. The flow control device of claim 11 wherein activation of the solenoid causes the valve member to move away from the second stop and establish momentum before a retaining member of the valve member engages the valve element that is in sealing engagement against the valve seat, which momentum provides an impact against a portion of the valve element for moving the valve element away from the valve seat to an open position.

13. The flow control device of claim 10 wherein the valve member further comprises a passage extending longitudinally through a portion of the valve member, which passage permits fluid flow through the valve member to reduce the hydraulic effect acting against the movement of the valve member.

14. A flow control valve comprising:

a housing having an inlet, an outlet and a valve seat in a flow path between the inlet and the outlet;

a valve member having an end including a chamber opening therein, in which a valve element is slidably disposed, said valve member being slidable within the valve for reciprocally moving between a first position in which the valve element sealingly engages the valve seat to restrict fluid flow to the outlet, and a second position in which the valve element is spaced apart from the valve seat to permit fluid flow to the outlet;

a spring that provides a force for urging the valve member towards the first position, to move the valve element to engage the valve seat and the valve member into engagement with a stop, which stop prevents the valve member from impacting against the valve element in engagement with the valve seat; and a solenoid that, when activated, provides a force for urging the valve member towards the second position towards a stationary core, to move the valve member to engage and move the valve element away from the valve seat to an open position.

15. The flow control valve of claim 14 further comprising a resilient dampening member disposed between the valve member and the stationary core, wherein the resilient dampening member is independent from the stationary core and the valve member and prevents direct contact between the valve member and the stationary core to dampen the impact of the valve member against the stationary core.

16. The flow control valve of claim 15 wherein the valve element is sufficiently spaced apart from the moveable valve member such that when the valve element engages the valve seat, the valve member engages a stop before the moveable member makes contact with the valve element, such that any impact of the valve member against the valve element is prevented.

17. The flow control valve of claim 16 wherein activation of the solenoid causes the valve member to move away from the second stop and establish momentum before a retaining member of the valve member engages the valve element that is in sealing engagement against the valve seat, which momentum provides an impact against a portion of the valve element for moving the valve element away from the valve seat to an open position.

18. The flow control valve of claim 16 wherein the valve member further comprises a slot forming a passage extending through a portion of the valve member, which passage permits fluid flow through the valve member as the valve member is moved, to reduce the hydraulic effect acting against the movement of the valve member.

19. The flow control valve of claim 1 further comprising a resilient dampening member disposed between the movable valve member and the stationary core, wherein the resilient dampening member is independent from the stationary core and the valve member, and prevents direct contact between the valve member and the stationary core to dampen the impact of the valve member against the stationary core.

20. The flow control valve of claim 8 further comprising a resilient dampening member disposed between the valve member and the second stop, wherein the resilient dampening member is independent from the second stop and the valve member and prevents direct contact between the valve member and the second stop to dampen the impact of the valve member against the second stop.

* * * * *